United States Patent [19]

Hollinger

[11] Patent Number: 5,170,579
[45] Date of Patent: Dec. 15, 1992

[54] ARTIFICIAL FISH LURE

[76] Inventor: Douglas G. Hollinger, 1929 S. 12th St., Council Bluffs, Iowa 51501

[21] Appl. No.: 669,031

[22] Filed: Mar. 14, 1991

[51] Int. Cl.$^5$ ............................................. A01K 85/00
[52] U.S. Cl. .................... 43/42.06; 43/42.22; 43/42.47
[58] Field of Search ............ 43/42.22, 42.31, 42.06, 43/42.47, 42.45, 42.48, 42.32, 42.35, 42.11

[56] References Cited

U.S. PATENT DOCUMENTS

| D. 185,149 | 5/1959 | Hughes | 43/42.47 |
|---|---|---|---|
| 2,233,684 | 3/1941 | Strite | 43/42.47 |
| 2,659,176 | 11/1953 | Wenger | 43/42.31 |
| 2,749,647 | 6/1956 | Beloff | 43/42.06 |
| 2,787,076 | 4/1957 | Kring | 43/42.22 |
| 2,994,982 | 8/1961 | Murawski | 43/42.06 |
| 3,105,317 | 10/1963 | Fox | 43/42.31 |
| 3,751,842 | 8/1973 | Smith | 43/42.47 |
| 4,205,476 | 6/1980 | Hsu | 43/42.06 |

FOREIGN PATENT DOCUMENTS 1317262 12/1961 France ................ 43/42.06

Primary Examiner—Richard K. Seidel
Assistant Examiner—James Miner
Attorney, Agent, or Firm—Philip J. Lee

[57] ABSTRACT

An artificial lure is disclosed having loose ballast contained within a sealed cavity. One embodiment of the lure is generally configured to have an outward appearance similar to that of a small fish with a tail of a second smaller fish protruding from its mouth, the tail forming a generally planar surface extending at a downward angle to serve as a diving plane when the lure is drawn through the water. A second embodiment of the lure is generally configured to present an outward appearance similar to that of a crayfish. The second embodiment of the lure is drawn through the water tail first and configured such that the swimmerets are fanned and extend in a downward angle to serve as a diving plane when the lure is drawn through the water. The second embodiment of the lure further comprises a pouch for receiving bait or a scented substances, the open end of the pouch being toward the leading end of the lure and the trailing end of the pouch being ventilated by a plurality of foramen to allow the flow of the water through and out of the pouch to release scent along the trail of the lure when drawn through the water.

4 Claims, 2 Drawing Sheets

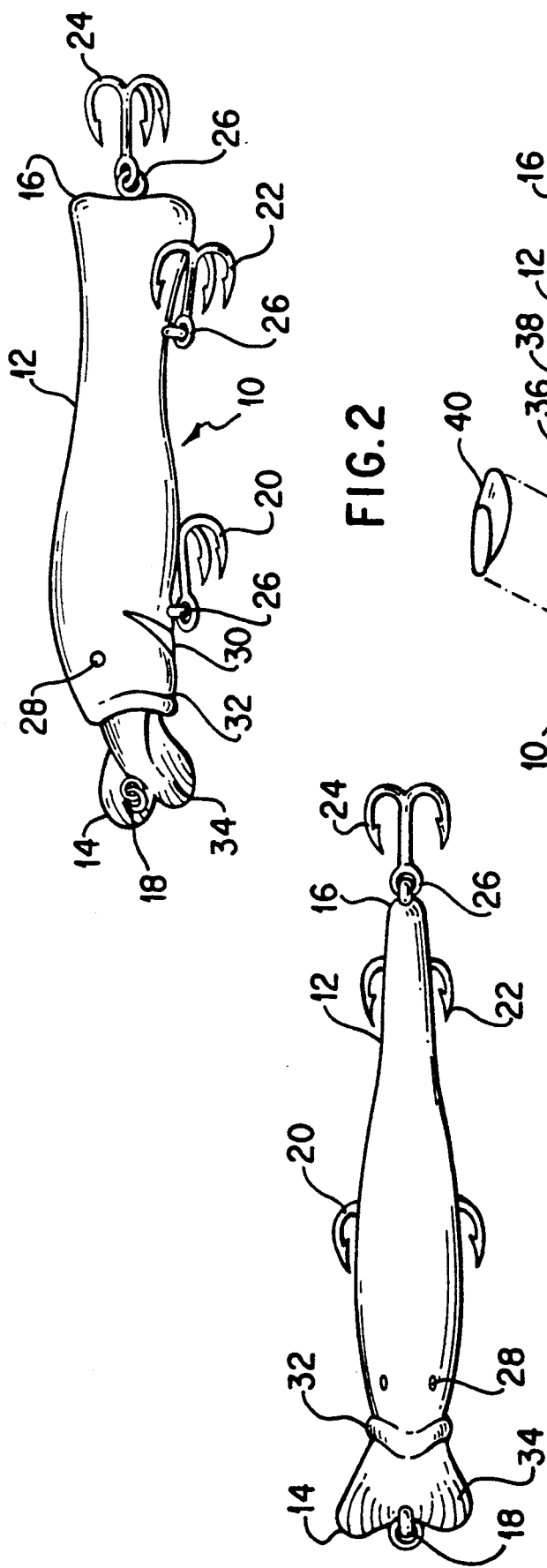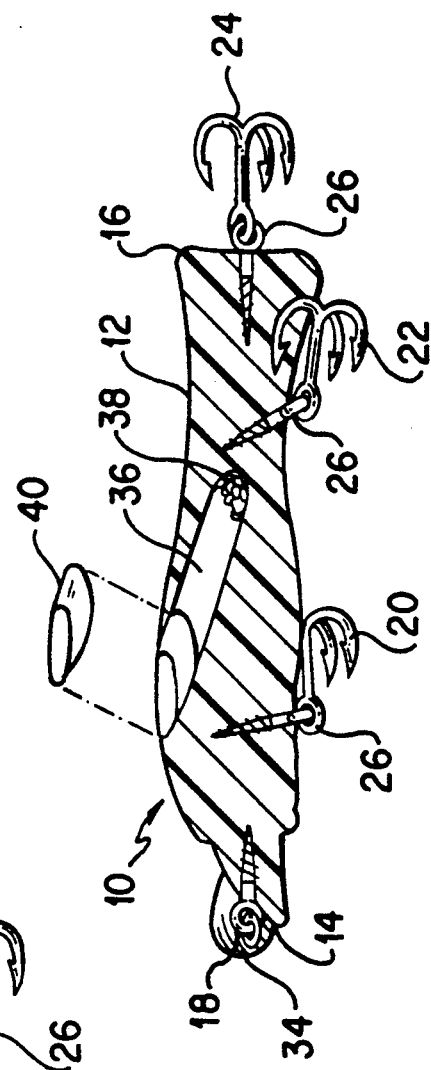

ARTIFICIAL FISH LURE

II. BACKGROUND OF THE INVENTION

A. Field of Invention

The present invention relates generally to fishing devices and more particularly to artificial fishing lures designed to be towed through water.

B. Description of Related Art

A number of artificial fishing lures are commonly used in connection with a rod, reel and line system used to attempt to catch fish by enticing them to attack or attempt to eat the lure which is fitted with hooks or other apparatus for capturing the fish. Such artificial lures are frequently drawn or towed through the water by trolling or by casting and retrieving. In order to attain the proper depth when drawn through the water, common lures frequently employ a diving plane surface commonly positioned at the leading end of the lure and inclined downward with respect to the lure so the lure tends to dive downward upon being pulled through the water. The common means for providing a diving plane is to attach a flat piece of metal or plastic to the leading end of the lure angling the same forward and downward when the lure is designed to have normally top and bottom sides. Such common diving planes are generally formed of either clear plastic or a brighter metallic material in the hope that the clear plastic plane will not be a visible distraction from the resemblance the lure bears to natural food of the species of fish sought or that the bright or metallic plane will attract the attention of the desired fish. U.S. Pat. No. 4,869,014 to Francklyn and U.S. Pat. No. 4,777,761 to Renaud demonstrate the use of such diving planes in connection with fishing lures. Such conventional diving planes generally give a mechanical and unnatural appearance to the lure and distract from their resemblance to normal food of the fish sought to be lured as well as frightening the fish thereby diminishing the effectiveness of the lure in catching fish.

In addition, artificial fishing lures have been combined with at least a small portion of natural bait as in U.S. Pat. No. 4,869,014 to Francklyn or with an artificial means for releasing a fish attractant scent such as the sponge in the U.S. Pat. No. 4,823,497 to Pierce. The Francklyn device retains a natural bait by attaching the same to the back of the lure. It would be expected that when the Francklyn lure is to be moved through the water, or while casting, flung through the air, the bait can readily become detached and lost. The sponge of the Pierce lure, being placed in a traverse bore, would not be as subject to displacement and loss caused by sudden axial movement of the lure, or by the force of the water through which it is passed. However, the traverse positioning of the sponge only allows the flowing water to pass over the relatively small end surfaces of the sponge and therefore limits the efficiency of the scent dispersal function.

III. SUMMARY OF THE INVENTION

The lure of the present invention utilizes natural anatomical features of common prey of a variety of species of fish to achieve the swimming and diving pattern of movement desirable in an artificial fishing lure. One such embodiment of the present invention is formed to resemble a small fish such as a common minnow that is in the act of swallowing a smaller fish. The smaller fish is shown being partially swallowed head first so that the caudal fin of the fish being eaten protrudes from the mouth of the larger fish and is somewhat laterally enlarged and angled in a forward, downward or ventral direction relative to the larger fish portrayed by the lure. The lure is moved through the water by means of a line medially attached to the top or dorsal side of the lure near the leading end of the lure which corresponds to the anterior of the minnow portrayed by the lure. The caudal fin of the smaller fish therefore serves as a diving plane surface for the lure as a whole. By this means, no artificial or mechanical appearing diving planes are required to be incorporated into the design of the fishing lure to provide the desired diving and swimming action when trolled or mechanically retrieved through the water. Thus the resemblance of the lure to the appearance of a natural prey of a wide variety of species i.e. that of a food fish engaged in feeding behavior is maintained without loss of performance.

A second embodiment of the lure of the present invention is generally formed in the shape of a fresh water prawn also known as crayfish or "crawdad". The fishing line is medially attached at the top of the second embodiment corresponding to the dorsal area of the abdomen of the crayfish, toward the leading end of the lure which corresponds to the posterior of the crayfish. In this embodiment the caudal swimmerets of the crayfish are radially fanned, as opposed to the contracted position, and are extended at a downward angle such that the swimmerets form a diving plane extending relatively forward and downward of the path the lure travels when being towed or retrieved. The tail or posterior of the crayfish portrayed by the second embodiment of the present invention is the leading end of the lure and the leading end of the first embodiment of the present invention corresponds to the anterior of the minnow portrayed by the lure. Both embodiments of the present invention are without mechanical appearing appendages and nevertheless possess the requisite hydrodynamic properties required for the maintenance of the desired depth according to the rate of speed through the water. Both embodiments also exhibit a swimming motion. Both preferred embodiments comprise a hollow chamber in which shot, pellets or other such items of substances having a relatively high specific gravity are placed for the purpose of insuring the appropriate buoyancy as well as to provide a rattling sound to attract attention of fish. The weighted objects are loose and readily moveable and further provide a variable and irregular balance such that the lure while remaining generally upright exhibits the wobbling action similar to an injured or struggling prey of the fish sought.

In addition, the second embodiment of the present invention further comprises a pouch for receiving natural bait or scented material or other fish attracting substances. The pouch is a partially blind bore that extends in a generally dorsal and anterior direction from an opening on the ventral side of the abdomen of the crayfish portrayed by the lure toward the posterior end. Therefore, the pouch extends from an opening located at the bottom side of the lure, upward and toward the trailing end of the lure. The end of the pouch, toward the trailing end of the lure, is ventilated by a plurality of foramen of relatively small diameter compared to the main pouch opening. The configuration of the bait pouch of the second preferred embodiment allows bait or scented material to be simply stuffed into the pouch and retained therein frictionally as well as by the centrifugal force experienced upon casting and the hydrodynamic force experienced on retrieval or trolling. On retrieval or trolling the foramen act as vents to allow the flow of water through the pouch and around the bait thereby continuously releasing the scent or fish attractant along the path taken by the lure. Since the pouch opens in the direction of the attachment of the fishing line, the bait material will be easily retained in the pouch.

The principal aim of the present invention is to provide a new and improved fishing lure comprising a diving plane surface while being configured to visually represent the natural appearance of the prey of a number of species of fish sought to be caught by means of fishing lure and line.

Another further object and aim of the present invention is to provide a new and improved fishing lure capable of readily retaining therein an artificial bait material or scented substance such that scent is readily disbursed.

Another further object and aim of the present invention is to provide a new and improved fishing lure utilizing loose ballast to provide a rattling noise and erratic swimming motion.

Other objects and advantages of the invention will become apparent from the Description of the Preferred Embodiments and the Drawings and will be in part pointed out in more detail hereinafter.

The invention consists in the features of construction, combination of elements and arrangement of parts exemplified in the construction hereinafter described and the scope of the invention will be indicated in the appended claims.

IV. BRIEF DESCRIPTION OF THE DRAWINGS

FIG. 1 is an top, dorsal perspective view of the first preferred embodiment of the present invention.

FIG. 2 is a side, lateral perspective view of the first preferred embodiment of the present invention.

FIG. 3 is a longitudinal section view showing the first preferred embodiment of the present invention sectioned on the dorsal-ventral plane along the axis of the invention.

V. DESCRIPTION OF THE PREFERRED EMBODIMENT(S)

Figure 4:
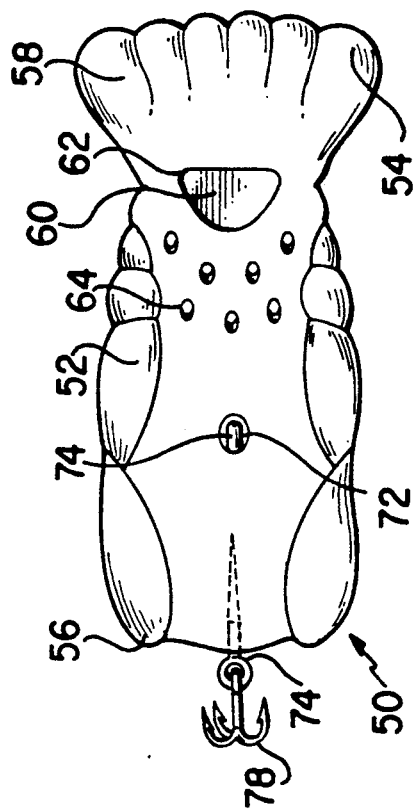
FIG. 4 is a top, dorsal view of the second embodiment of the present invention.
Figure 5:
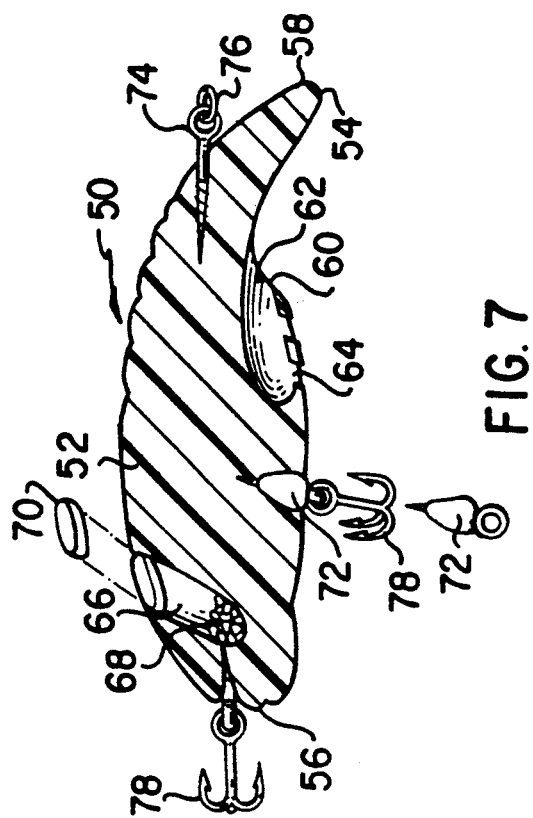
FIG. 5 is a side, lateral view of the second preferred embodiment of the present invention.
Figure 6:
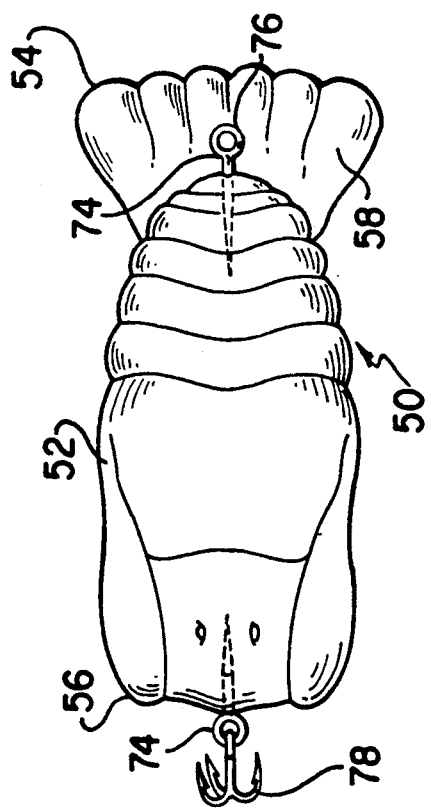
FIG. 6 is a bottom, ventral view of the second embodiment of the present invention.

With reference to the Drawings wherein like numerals represent like parts throughout the figures, a first preferred embodiment of a fishing lure in accordance with the present invention is generally designated in FIG. 1 by numeral 10 and a second preferred embodiment of a fishing lure in accordance with the present invention is generally designated in FIG. 4 by numeral 50.

First preferred embodiment 10 comprises a body 12 having a leading end 14 and a trailing end 16 with a means for securing a fishing line comprising screweye 18 attached to body 12 in a medial position on the dorsal, or top, side of body 12 toward leading end 14. Hook 20 is fixed in a medial position on the ventral, or bottom side, of body 12 at approximately ⅓ the distance from the leading edge 14 to the trailing edge 16, hook 22 is similarly fixed to a medial and ventral position ⅔ of the distance from the leading edge 14 to the trailing edge 16 of body 12 and hook 24 is affixed to the trailing end 16 of body 12. Hooks 20,22,and 24 are each attached to body 12 by means of screweyes 26.

The first embodiment 10 of the present invention comprises body 12 configured to be similar in outward appearance to a minnow or small fish in the process of partially ingesting a smaller fish such that the caudal fin of the smaller fish protrudes from the mouth of the larger fish. The trailing end 16 of body 12 therefore is similar in shape, size, appearance and features to the posterior of a small fish or minnow and body 12 further comprises eyes 28, gills 30 and mouth 32. The leading end 14 of the lure body 12 comprises a diving plane area 34 having an outward appearance similar to the caudal fin of the smaller fish that appears to be partially ingested, head first. Area 34 is generally laterally broadened, dorsally flattened and fan shaped and is generally planar in a plane that is normal to the dorsal-ventral plane of the lure body 12 and generally extends toward the leading end 14 in a downward, ventral angle of 45 degrees or less to the general axis of lure body 12. The point of attachment of fishing line screweye 18 to lure body 12 is on the median of the top or dorsal side of area 34 and is slightly displaced from the edge of leading end 14. The angle of area 34 to the axis of the body 12 and the placement of screweye 18 is such that the first preferred embodiment 10 tends to dive deeper into the water on being drawn through the water. Additionally, a chamber 36 is formed within lure body 12 and retains therein a plurality of weighted elements 38. Chamber 36 is formed by drilling a blind bore into body 12 from the top or dorsal side which bore is closed by plug 40 after insertion of weighted elements 38. Plug 40 may be made removable such that the amount of ballast comprised of elements 38 may be varied. Since the illustrated preferred embodiments 10 and 50 are constructed of a material having a positive buoyancy, weighted elements 38 are formed of lead, steel or other material having a relatively high specific gravity to provide sufficient ballast to appropriately reduce the buoyancy of Lure 10. In addition, elements 38 are small enough and few enough that when introduced into chamber 36, elements 38 will remain loose and have room to move about Chamber 36 to provide a rattling sound to attract the attention of a fish. Moreover, the loose ballast effect of elements 38 causes the center of gravity to temporarily shift as the elements 38 move about within chamber 36 resulting in a realistic wobbling motion of lure 10 when towed through the water. The chamber bore 36 extends toward the trailing edge and opens toward the lead edge 14, as shown in FIG. 3. In addition to the frictional retention of plug 40 within said bore, plug 40 will tend to be kept in place by the hydrodynamic force of the water through which the lure 10 is being towed or trolled.

A second preferred embodiment of the present invention is designated in FIG. 4 by the numeral 50 is a fishing lure similar in many respects to the first preferred embodiment 10. Lure 50 comprises of body 52 outwardly configured to be similar to the outward appearance of a fresh water prawn also known as crayfish or "crawdad" being a member of phylum arthropoda, class crustacea. Lure body 52 comprises leading end 54 and a trailing end 56, the posterior end of the crayfish depicted by body 50 being at the leading end 54 and the anterior portion of the crayfish being at the trailing end 56. Leading end 54 comprises a dorsally flattened laterally broadened, diving plane area 58 configured to be similar in appearance to the fan-like fins of the extended caudal swimmerets of the crayfish. Intermediate between the area 58 and the trailing end 56 in the portion representing the abdominal area of the crayfish depicted by body 52, a pouch 60 is formed on the ventral or bottom side of body 52. Pouch 60 comprises a bore extending from opening 62 in a generally anterior direction toward trailing end 56, which bore would be blind except for plurality of foramen 64 providing fluid communication between the interior of pouch 60 and the outside of lure body 52. In the illustrated second preferred embodiment 50, foramen 64 are 7 in number and are equally spaced. It is anticipated that while other numbers, placement, and sizes of foramen 64 should may be utilized. The size and number of foramen 64 should be such that pouch 60 retains the capability of holding soft or amorphous bait or other scented substance. The lure body 52 is formed such that the portion corresponding to the cephalothorax of the crayfish depicted by body 52 is somewhat laterally broadened and dorsally flattened dorsally and the legs and claws of the crawfish are generally extended and placed lateral to the cephalothorax of the crayfish portrayed by lure 50. Accordingly, the overall configuration of the body 52 is generally laterally broadened and dorsally flattened.

Figure 7:
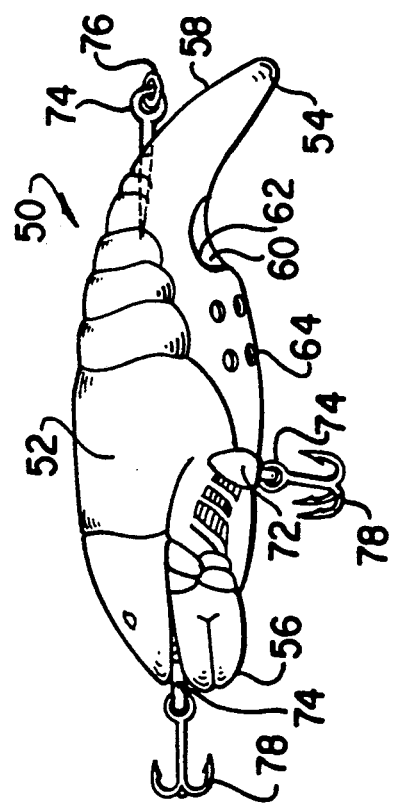
FIG. 7 is a longitudinal sectional view of the second preferred embodiment of the present invention shown, sectioned in the dorsal-ventral plane along the longitudinal axis of the invention.

Additionally, a chamber 66 is formed within lure body 52 and retains therein weighted elements 68. Chamber 66 is formed by drilling a blind bore into body 52 from the dorsal side which bore is closed by plug 70 after insertion of weighted elements 68. Plug 70 may be made removable such that the amount of ballast comprised of elements 68, may be varied. Since the illustrated preferred embodiment 50 is constructed of a material having a positive buoyancy, weighted elements 68 are formed of lead, steel or other material having a relatively high specific gravity to provide sufficient ballast to appropriately reduce the buoyancy of Lure 50. In addition, elements 68 are small enough and few enough that when introduced loosely into Chamber 66. Elements 68 provide a rattling sound to attract the attention of a fish. Moreover, the loose ballast effect of elements 68 causes temporary shifts in the center of gravity of body 52 as the elements 68 move about within chamber 66 resulting in a realistic wobbling motion of lure 50 when towed through the water. The bore of chamber 66 extends toward the trailing edge 56 and opens toward the leading edge 54, as shown in FIG. 7. In addition to the frictional retention of plug 70 within said bore, plug 70 will tend to be kept in place by the hydrodynamic force of the water through which the lure 50 is being towed or trolled. The second embodiment is attached to the fishing line at ring 76 which with the hooks 78 is attached to body 52 by means of screweyes 74. In addition, a plug 72 of lead or other relatively heavy material is inserted into the ventral side of lure 50 at a medial position intermediate between the leading end 54 and the trailing end 56. The plug 72 serves to provide additional ballast to achieve the desired degree of buoyancy and therefore the exact weight of plug 72 will vary depending upon the buoyancy of the lure body 52 and the exact location of plug 72 will depend upon the desired balance front to back.

In the illustration of the preferred embodiments in FIGS. 3 and 7, screweyes 18, 26 and 74 are secured to the body of the invention by a male screw portion similar to a typical wood screw, which attachment is appropriate for the construction of the invention being carved from wood. The introduction of a glue (not shown) into the screw bore is found generally to increase the retentive capacity of the screweyes. It is anticipated that other potentially beneficial means for providing attachment eyelets to lure body are available when the lure is constructed from other substances. In particular, it is anticipated that embodiments utilizing molded plastic substances for the construction of the body, allow a wire or rod of appropriately high strength material to be embedded in the lure body so that each hook would be securely and directly connected to the fishing line without regard to the strength of the material used for molding the lure body. Thus, while the illustrated preferred embodiments are formed of wood, other materials could be used provided appropriate modifications are made as required due to material characteristics.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. An artificial fish lure comprising a lure body having a leading end and a trailing end, and being generally configured to present an outward appearance similar to that of a first fish with a tail of a second smaller fish extending from a mouth of the first fish and the leading end forms a downward extending planar, laterally broadened and dorsally flattened area, said area becoming more narrow toward the mouth of the first fish and the surface of said area having a series of ridges extending toward the edge of the leading end which edge forms a generally smooth curve and is centrally indented to have the detailed appearance of a tail fin of the second, smaller fish, and the trailing end forms a vertically planar area shaped to resemble a tail of the first fish, the lure body additionally forming a cavity loosely containing one or more objects therein and further comprising plug means for sealing the cavity.

2. An artificial fish lure according to claim 1 wherein the objects within the sealed cavity are formed of substances having a negative buoyancy in water.

3. An artificial fish lure comprising a lure body having a leading end and a trailing end, a dorsal side and a ventral side and being generally configured to present an outward appearance similar to that of a crayfish, the leading end forming a downward extending planar, laterally broadened and dorsally flattened area shaped to resemble extended caudal swimmerets of the depicted crayfish, the lure body additionally forming a cavity loosely containing one or more objects therein and further comprising plug means for sealing the cavity, the lure body additionally comprising a means for retaining scented substances comprising an open pouch having means for introducing scented substances into and removing scented substances from the pouch comprising an open end toward the leading end of the lure, on the ventral side of the lure, the open end having a large opening that has an internal area similar to the interior of the pouch and is not closeable, the pouch extending from the open end into the body of the lure toward the trailing end, with a plurality of foramen providing fluid communication through the ventral wall of the pouch, the foramen being smaller than the opening at the open end and sized to allow only water, scent and small particles to exit the pouch, and the dorsal wall of the pouch being closed.

4. An artificial fish lure according to claim 1 wherein the objects within the sealable cavity are formed of substances having a negative buoyancy in water, and being sufficiently ballasted with weighted material located on the ventral side to prevent the lure from having the ventral side toward the surface of the water when in operation.

* * * * *